Feb. 9, 1965 R. A. NELSON 3,169,112
DISPOSABLE FILTERS
Filed June 30, 1961
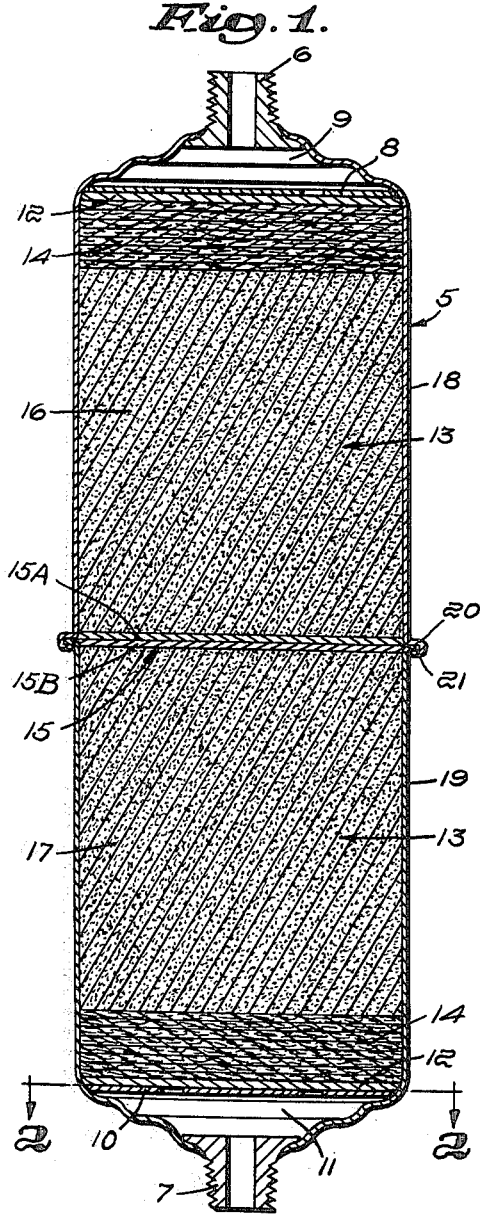
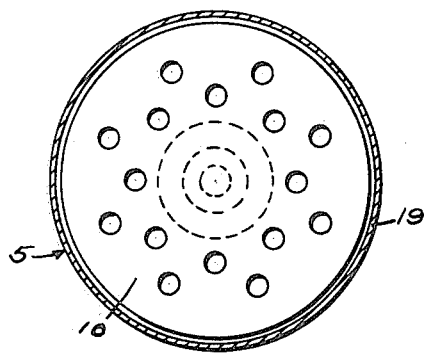
Inventor:
Roy A. Nelson,
by [signature]
Attorney 3,169,112
DISPOSABLE FILTERS
Roy A. Nelson, Lynnfield Center, Mass.
(172 Cambridge St., Boston, Mass.)
Filed June 30, 1961, Ser. No. 121,227
3 Claims. (Cl. 210—266)

The present invention relates to filters for use in the filtering of liquids and gasses and as mufflers.

There is an ever growing demand for inexpensive filters that may be effectively employed with fluid streams. In air, oil, and water lines, for example, filtering is a common requirement and it is often preferred to use, in preference to those of the cartridge type, filters that can be periodically discarded.

The problem has been to make efficient "throw-away" filters within the price range that such filters can command and elimination of the problem is the principal objective of this invention. The difficulty arises with the body of activated carbon which is the principal filtering medium and is of a particle size that will provide a suitably porous body, when compacted, for the fluid being filtered.

Both the efficiency and filter life depend on the mass of activated carbon used. While activated carbon is relatively inexpensive, neither efficiency nor filter life is increased to the expected extent simply by, say, doubling the thickness of any activated carbon body. The difficulty arises from the fact that where the inelt and outlets are alined and of smaller cross sectional area than the activated carbon body, the flow through that body tends to follow a central path and efficiency is lost to the extent that the flow is not spreading throughout the entire cross sectional area. This is particularly true where production techniques may not enable the activated carbon body to be sufficiently compacted. In accordance with the invention, this difficulty is eliminated by employing means for positively spreading the fluid flow through the activated carbon body at regular intervals related to the thickness thereof.

In the accompanying drawings, there is shown an illustrative embodiment of the invention from which these and other of its objectives, novel features, and advantages will be readily apparent.

In the drawings:

FIG. 1 is a longitudinal section of a filter in accordance with the invention, and FIG. 2 is a section taken approximately along the indicated lines 2—2 of FIG. 1.

The filter comprises a cylindrical casing 5 having axially alined inlet and outlet ports indicated at 6 and 7, respectively, and shown as threaded fittings enabling the filter to be quickly and easily installed in or removed from a line.

Within the filter casing 5 there is a perforate metal disc 8 adjacent the inlet port 6 and defining therewith an inlet chamber 9. A like disc 10 is located adjacent the outlet port 7 and defines therewith an outlet chamber 11.

The discs 8 and 10 serve as retainers to confine between them the filtering media which is shown as consisting of a layer of felt 12 seated against each disc. The main filtering medium is an activated carbon body 13 and a cotton layer 14 is disposed between each end of the activated carbon body 13 and the retainer proximate thereto.

The activated carbon body 13 is of substantial thickness and is divided by a felt barrier, which is generally indicated at 15, into layers 16 and 17 which causes a spreading flow of the fluid at the outlet end of the layer 16 thus to ensure more complete use of the layer 17 of the activated carbon body.

In the filter shown in the drawings, the casing 5 is shown as consisting of two end sections 18 and 19 joined together by interlocked flanges 20 and 21. In practice, approximately one-half of the filtering media is placed in each section and to prevent their loss or disturbance, the barrier 15 has two layers, the layer 15A and the layer 15B, one in each casing section and functioning as a retainer during assembly.

Filters in accordance with the invention are efficient over relatively long periods of use due to the effective positive spreading of fluid transversely of the activated carbon body.

I claim:

1. In a device such as a filter for a fluid or a muffler, a casing having alined, necked inlet and outlet ports, a perforate metal retainer adjacent but spaced from each port, said retainers being marginally supported by said casing, a plurality of filtering layers between said retainers including, as the principal medium, a predetermined thickness of activated carbon in the form of at least two layers, said carbon layers being such as to ensure that said compacted carbon layers are porous, and a felt layer between said two carbon layers providing a flexible barrier between them thus to cause a spreading flow of the fluid at the outlet side of the carbon layer proximate to the inlet.

2. In a device such as a filter for a fluid or a muffler, a casing having alined, necked inlet and outlet ports, a perforate metal retainer adjacent but spaced from each port and marginally supported by said casing, a plurality of filtering layers between said retainers including a felt layer adjacent each retainer, a body of activated carbon of predetermined thickness as the principal medium, a cotton layer between each end of said body and the proximate felt layer, said body being in the form of at least two layers, said carbon layers being compacted and the carbon particle sizes being such as to ensure that said compacted carbon layers are porous, and a felt layer between said two carbon layers providing a flexible barrier between them thus to cause a spreading flow of the fluid at the outlet side of the carbon layer proximate to the inlet.

3. In a device for use as a filter for a fluid or as a muffler, a casing including two sections each having a necked port at one end and an outwardly disposed peripheral flange at the other end thereof, said flanges being locked together, one port being the filter inlet and the other port being the filter outlet, a perforate metal retainer adjacent to but spaced from each port and marginally supported by the appropriate one of said sections, a plurality of filtering layers between said retainers, said layers being held together between said retainers in effective filtering relationship when said filters are locked together, said layers including, as the prinicipal medium, a predetermined thickness of activated carbon in the form of at least two layers, said carbon layers being compacted and the carbon particle sizes being such as to ensure that said compacted carbon layers are porous, and a pair of felt layers between said two carbon layers providing a flexible barrier between them in the zone of the joined flanges serving both to hold the activated carbon in place in assembly and to cause a spreading flow of the fluid at the outlet side of the carbon layer proximate to the inlet.

References Cited by the Examiner

UNITED STATES PATENTS

| | | | |
|---|---|---|---|
| 847,518 | 3/07 | Schiltz | 210–289 |
| 1,730,581 | 10/29 | McMachen | 210—284 X |
| 2,057,237 | 10/36 | Hoop. | |
| 2,325,657 | 8/43 | Burkness | 210—289 X |
| 2,582,388 | 1/52 | Mansfield | 210—335 X |

FOREIGN PATENTS 377,743    7/07    France.

REUBEN FRIEDMAN, *Primary Examiner.*

HERBERT L. MARTIN, *Examiner.*